US012370392B2

(12) United States Patent
Zhang et al.

(10) Patent No.: US 12,370,392 B2
(45) Date of Patent: Jul. 29, 2025

(54) AIR MIXER FOR COMPRESSED AIR FOAM FIRE-EXTINGUISHING SYSTEM AND FIRE-EXTINGUISHING SYSTEM

(71) Applicants: STATE GRID ANHUI ELECTRIC POWER RESEARCH INSTITUTE, Anhui (CN); State Grid Corporation of China, Beijing (CN)

(72) Inventors: Jiaqing Zhang, Anhui (CN); Yong Huang, Anhui (CN); Yifu Zhou, Anhui (CN); Jinzhong Li, Anhui (CN); Xiaodong Zhang, Anhui (CN); Dengfeng Cheng, Anhui (CN); Sha Luo, Anhui (CN); Yi Guo, Anhui (CN); Fengju Shang, Anhui (CN); Yubiao Huang, Anhui (CN); Rui Liu, Anhui (CN)

(73) Assignees: STATE GRID ANHUI ELECTRIC POWER RESEARCH INSTITUTE, Hefei (CN); State Grid Corporation of China, Beijing (CN)

( * ) Notice: Subject to any disclaimer, the term of this patent is extended or adjusted under 35 U.S.C. 154(b) by 0 days.

(21) Appl. No.: 17/925,837

(22) PCT Filed: Aug. 1, 2022

(86) PCT No.: PCT/CN2022/109369
§ 371 (c)(1),
(2) Date: Nov. 17, 2022

(87) PCT Pub. No.: WO2023/011396
PCT Pub. Date: Feb. 9, 2023

(65) Prior Publication Data

US 2024/0226624 A1 Jul. 11, 2024

(30) Foreign Application Priority Data

Aug. 6, 2021 (CN) ........................ 202110902510.8

(51) Int. Cl.
*A62C 31/12* (2006.01)
*A62C 5/02* (2006.01)
*A62C 31/28* (2006.01)

(52) U.S. Cl.
CPC .............. *A62C 31/12* (2013.01); *A62C 5/024* (2013.01); *A62C 31/28* (2013.01)

(58) Field of Classification Search
CPC ......... A62C 5/022; A62C 5/024; A62C 31/12; B05B 7/0025; B05B 7/0031; B05B 7/0037; B05B 7/0483
(Continued)

(56) References Cited

U.S. PATENT DOCUMENTS 3,982,663 A * 9/1976 Larkin ...................... F04B 9/02 222/255
6,036,116 A * 3/2000 Bui .................... B22D 11/1246 239/432
(Continued)

FOREIGN PATENT DOCUMENTS

CN 202409906 U 9/2012
CN 208364968 U * 1/2019
(Continued)

*Primary Examiner* — Cody J Lieuwen

(57) ABSTRACT

The present disclosure provides an air mixer for a compressed air foam (CAF) fire-extinguishing system. A foam concentrate and compressed air are respectively transported by a liquid inlet pipe and an air inlet pipe. When the compressed air and the foam concentrate enter a straight pipe through a first tapered pipe, they reach an outlet end of the first tapered pipe through a path narrowing due to different cross-section diameters at two ends of the first tapered pipe, and there is a compression process. Under an action of a high-pressure airflow, the foam concentrate is fully mixed. The mixed foam concentrate reaches a porous plate of the straight pipe and can be mixed secondarily. When the foam concentrate is discharged by a second
(Continued)

tapered pipe, a flow path widens and there is a release process.

8 Claims, 4 Drawing Sheets

(58) Field of Classification Search
USPC .................................................... 169/14, 15
See application file for complete search history.

(56) References Cited

U.S. PATENT DOCUMENTS

| | | | | |
|---|---|---|---|---|
| 6,138,926 | A * | 10/2000 | Russo | B08B 3/026 239/366 |
| 2014/0352985 | A1* | 12/2014 | McLoughlin | A62C 5/022 169/13 |
| 2017/0106379 | A1* | 4/2017 | Nakano | B22D 11/1246 |
| 2017/0120092 | A1* | 5/2017 | Haider | B01F 25/45211 |
| 2021/0346740 | A1* | 11/2021 | Jiang | A62C 5/022 |

FOREIGN PATENT DOCUMENTS

| | | | | |
|---|---|---|---|---|
| CN | 109481871 A | | 3/2019 | |
| CN | 210135450 U | | 3/2020 | |
| CN | 109481871 B | | 10/2020 | |
| CN | 112546499 A | * | 3/2021 | A62C 3/02 |
| CN | 216061791 U | | 3/2022 | |

* cited by examiner

AIR MIXER FOR COMPRESSED AIR FOAM FIRE-EXTINGUISHING SYSTEM AND FIRE-EXTINGUISHING SYSTEM

TECHNICAL FIELD

The present disclosure relates to the technical field of fire safety, and in particular to an air mixer for a compressed air foam (CAF) fire-extinguishing system and the fire-extinguishing system.

BACKGROUND

"Fire protection" means to eliminate hidden dangers and prevent disasters, and its narrow meaning in the early stage of people's understanding is to suppress a fire. It mainly includes the rescue of personnel at fire scenes, the rescue of important facilities, devices and cultural relics, the safe protection and rescue of important properties, and fire suppression, etc.

During fire suppression, a foam concentrate will be used to extinguish the fire. For existing CAF fire-extinguishing systems, foams are often directly mixed with water, and ejected through compressed air. However, the mixing effect is so poor that the foam concentrate cannot effectively extinguish the fire; and meanwhile, pipes are very likely to be damaged due to an unstable pressure in transportation of the compressed air.

For example, the Chinese patent application No. 201120525546.0 discloses a fully automatic integrated CAF fire-extinguishing system. After the system is started to work normally, water enters from an inlet of a pump. The pump may act as an ordinary fire pump from which water can be pumped out for fire suppression, where its low-pressure performance is completely the same as that of an ordinary vehicle-mounted pump. If a valve of a class-B foam mixer on the fire pump is opened, class-B fire suppression can be realized. If a foam liquid supply system is opened, a class-A foam concentrate is mixed with pressurized water pumped out from the water pump to form a foam mixed solution. Now, if a pneumatic valve of an air supply pipeline is closed, the system ejects the foam solution. If the pneumatic valve of the air supply pipeline is opened, the foam solution is mixed with compressed air to form air foams to be ejected by a foam gun or cannon, thereby realizing efficient and quick fire suppression. A viscosity of the foam concentrate can be controlled by regulating a flow of ejected compressed air. In addition, the water conduit can further be closed, such that the system only provides a compressed airflow. According to this scheme, while the foam solution is ejected through the compressed air, the air is mixed with the foam concentrate. However, in the case of an unstable pressure, pipes are damaged easily.

SUMMARY

In view of the technical problem that pipes are damaged easily for an unstable pressure of compressed air in a foam extinguisher, the present disclosure provides an air mixer for a CAF fire-extinguishing system.

The present disclosure solves the above problem through the following technical solutions:

An air mixer for a CAF fire-extinguishing system includes a liquid inlet pipe (1), an air inlet pipe (2), a straight pipe (3), a first tapered pipe (4), a second tapered pipe (5), an energy storage mechanism (6), and a cushion mechanism (7), where the first tapered pipe (4) is a three-way pipe; the air inlet pipe (2), the first tapered pipe (4), the straight pipe (3), and the second tapered pipe (5) are sequentially connected according to an airflow direction; the liquid inlet pipe (1), the first tapered pipe (4), the straight pipe (3), and the second tapered pipe (5) are sequentially connected according to a foam concentrate direction; and small-diameter ends of the first tapered pipe (4) and the second tapered pipe (5) are respectively connected to an inlet end and an outlet end of the straight pipe (3);

- the energy storage mechanism (6) includes a blind pipe (61), a piston (62), and an energy storage spring (63); an inlet of the blind pipe (61) is sealingly fixed to an opening in a wall of the air inlet pipe (2); a cavity of the blind pipe (61) communicates with a cavity of the air inlet pipe (2); the piston (62) is positioned and limited in the blind pipe (61); and the energy storage spring (63) is limited between the piston (62) and a blind end of the blind pipe (61); and
- the cushion mechanism (7) includes a positioning ring (71), a guide post (72), a guide sleeve (73), and a damper spring (74); a limiting groove is formed in an outer periphery of the positioning ring (71); the straight pipe (3) is limited in the limiting groove; the positioning ring (71) is fixed on the guide post (72); the damper spring (74) is sleeved on the guide post (72); one end of the guide post (72) is limited in the guide sleeve (73), and is in sliding fit with the guide sleeve (73); the damper spring (74) is limited between the positioning ring (71) and the guide sleeve (73); and a position of the guide sleeve (73) is fixed.

According to the present disclosure, a foam concentrate and compressed air are respectively transported by a liquid inlet pipe and an air inlet pipe. When the compressed air and the foam concentrate enter a straight pipe through a first tapered pipe, they reach an outlet end of the first tapered pipe through a path narrowing due to different cross-section diameters at two ends of the first tapered pipe, and there is a compression process. Under an action of a high-pressure airflow, the foam concentrate is fully mixed. The mixed foam concentrate reaches a porous plate of the straight pipe and can be mixed secondarily. When the foam concentrate is discharged by a second tapered pipe, a flow path widens and there is a release process. Therefore, the present disclosure improves a mixing quality of the foam concentrate during the compression and release processes and can make full use of the fire extinguishing effect of the foam concentrate. A guide post can be guided by a guide sleeve, a damper spring can be limited by the guide post, and the straight pipe can be supported by the damper spring, such that kinetic energy of the straight pipe can be absorbed. When the foam concentrate and the compressed air pass through the straight pipe, the straight pipe is not vibrated easily, with good stability.

An energy storage spring supports a piston and is configured to store energy. An energy storage pipe (blind pipe) can guide and limit the piston. When transported by the air inlet pipe, the compressed air can apply a pressure to the piston in the case of a pressure surge due to an unstable pressure. The piston can transfer the pressure to the energy storage spring, and thus the energy storage spring is compressed. Therefore, an impact force arising from the pressure surge can be absorbed, which can cushion the pipe, and prevent the pipe from damaging casily. When the pressure in the air inlet pipe is restored to a normal pressure, the pressure applied to the piston is removed, and the energy storage spring can push the piston for restoration.

Further, there may be two energy storage mechanisms (6) that may be respectively positioned at a same side or different sides of the air inlet pipe (2).

Further, there may be two cushion mechanisms (7) that may be respectively positioned at a same side or different sides of the straight pipe (3).

Further, a porous plate (31) may further be fixed in the straight pipe (3).

Further, the air mixer may further include a housing (8); the straight pipe (3), the first tapered pipe (4), the second tapered pipe (5), the energy storage mechanism (6), and the cushion mechanism (7) may be positioned in the housing (8); an inlet end of each of the liquid inlet pipe (1) and the air inlet pipe (2) may be led out from the housing (8) to connect an external device; and the outlet end of the straight pipe (3) may be led out from the housing (8) to connect an external device.

Further, the guide sleeve (73) may be fixed in the housing (8).

Further, an end of the guide post (72) away from the guide sleeve (73) may abut against an inner wall of the housing (8); and a rubber pad (75) may be fixed on an abutting surface of the guide post (72).

Further, a one-way valve (11) may further be provided on the liquid inlet pipe (1).

Further, a digital barometer (21) and a digital hydraulic pressure gauge (12) may be respectively arranged on the air inlet pipe (2) and the liquid inlet pipe (1).

The present disclosure further provides a CAF fire-extinguishing system, including a foam concentrate supply system, a compressed air supply system, a foam ejector system, and the air mixer, where an outlet end of the foam concentrate supply system is connected to an inlet end of the liquid inlet pipe (1); an outlet end of the compressed air supply system is connected to an inlet end of the air inlet pipe (2); and an inlet end of the foam ejector system is connected to an outlet end of the second tapered pipe (5).

The present disclosure has the following advantages:

According to the air mixer for a CAF fire-extinguishing system provided by the present disclosure, a foam concentrate and compressed air are respectively transported by a liquid inlet pipe and an air inlet pipe. When the compressed air and the foam concentrate enter a straight pipe through a first tapered pipe, they reach an outlet end of the first tapered pipe through a path narrowing due to different cross-section diameters at two ends of the first tapered pipe, and there is a compression process. Under an action of a high-pressure airflow, the foam concentrate is fully mixed. The mixed foam concentrate reaches a porous plate of the straight pipe and can be mixed secondarily. When the foam concentrate is discharged by a second tapered pipe, a flow path widens and there is a release process. Therefore, the present disclosure improves a mixing quality of the foam concentrate during the compression and release processes and can make full use of the fire extinguishing effect of the foam concentrate. A guide post can be guided by a guide sleeve, a damper spring can be limited by the guide post, and the straight pipe can be supported by the damper spring, such that kinetic energy of the straight pipe can be absorbed. When the foam concentrate and the compressed air pass through the straight pipe, the straight pipe is not vibrated easily, with good stability.

According to the air mixer for a CAF fire-extinguishing system provided by the present disclosure, an energy storage spring supports a piston and is configured to store energy. An energy storage pipe can guide and limit the piston. When transported by the air inlet pipe, the compressed air can apply a pressure to the piston in the case of a pressure surge due to an unstable pressure. The piston can transfer the pressure to the energy storage spring, and thus the energy storage spring is compressed. Therefore, an impact force arising from the pressure surge is absorbed, which can cushion the pipe, and prevent the pipe from damaging easily. When the pressure in the air inlet pipe is restored to a normal pressure, the pressure applied to the piston is removed, and the energy storage spring can push the piston for restoration.

The damper spring can be cooperated with a rubber member to work jointly, thereby further reducing the influence of vibrations.

DETAILED DESCRIPTION

In order to make the objectives, technical solutions, and advantages of embodiments of the present disclosure clearer, the following clearly and completely describes the technical solutions in the embodiments of the present disclosure with reference to the embodiments of the present disclosure. Apparently, the described embodiments are some rather than all of the embodiments. All other embodiments obtained by those of ordinary skill in the art based on the embodiments of the present disclosure without creative efforts shall fall within the protection scope of the present disclosure.

Figure 1:
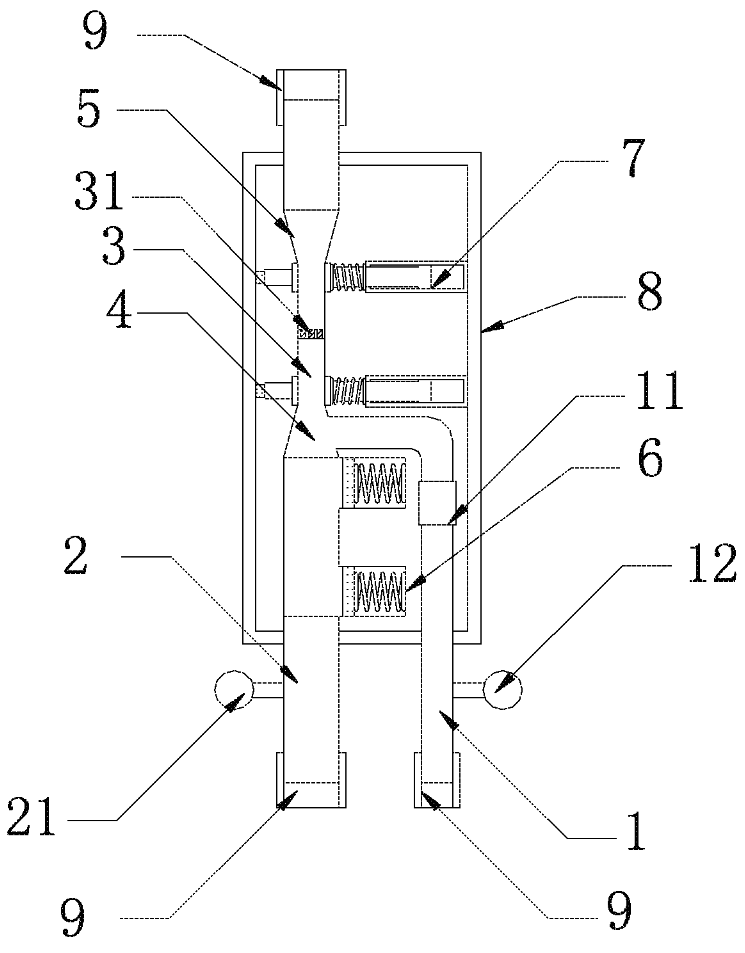
FIG. 1 is a schematic structural view of an air mixer for a CAF fire-extinguishing system according to an embodiment of the present disclosure.

As shown in FIG. 1, the embodiment discloses an air mixer for a CAF fire-extinguishing system, including a liquid inlet pipe 1, an air inlet pipe 2, a straight pipe 3, a first tapered pipe 4, a second tapered pipe 5, an energy storage mechanism 6, and a cushion mechanism 7. The first tapered pipe 4 is a three-way pipe, having a large-diameter end and a small-diameter end. An opening is formed in a wall of the first tapered pipe 4. The air inlet pipe 2, the first tapered pipe 4, the straight pipe 3, and the second tapered pipe 5 are sequentially connected according to an airflow direction. The liquid inlet pipe 1, the first tapered pipe 4, the straight pipe 3, and the second tapered pipe 5 are sequentially connected according to a foam concentrate direction. Small-diameter ends of the first tapered pipe 4 and the second tapered pipe 5 are respectively connected to an inlet end and an outlet end of the straight pipe 3.

Figure 2:
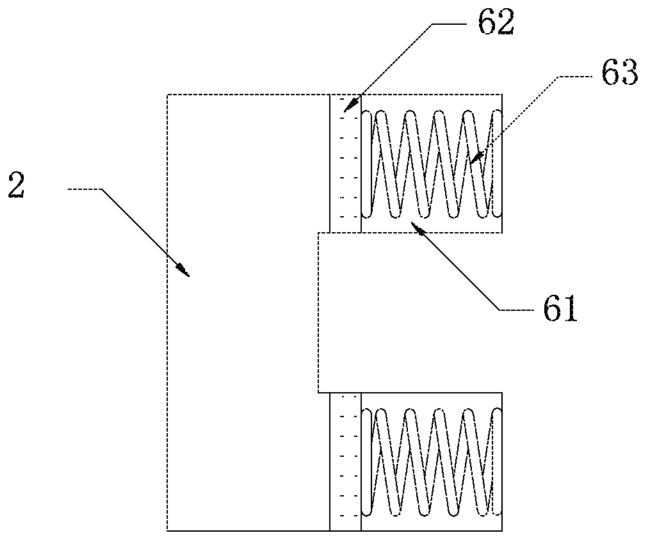
FIG. 2 is an enlarged view of an energy storage mechanism in FIG. 1.

As shown in FIG. 2, the energy storage mechanism 6 includes a blind pipe 61, a piston 62, and an energy storage spring 63. An opening is formed in a wall of the air inlet pipe 2. An inlet of the blind pipe 61 is sealingly fixed to the opening. A cavity of the blind pipe 61 communicates with a cavity of the air inlet pipe 2. The piston 62 is positioned and limited in the blind pipe 61. The energy storage spring 63 is limited between the piston 62 and an end wall of the blind pipe 61. In the embodiment, the energy storage spring 63 is generally a pressure spring.

Figure 3:
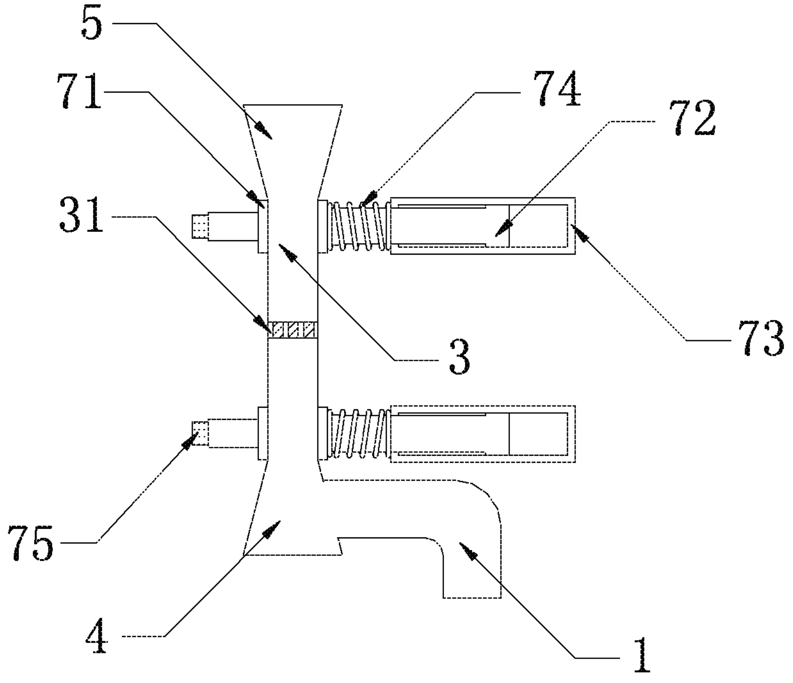
FIG. 3 is an enlarged view of a cushion mechanism in FIG. 1.

As shown in FIG. 3, the cushion mechanism 7 includes a positioning ring 71, a guide post 72, a guide sleeve 73, and a damper spring 74. A limiting groove is formed in an outer periphery of the positioning ring 71. The straight pipe 3 is limited in the limiting groove. The positioning ring 71 is fixed on the guide post 72. The damper spring 74 is sleeved on the guide post 72. One end of the guide post 72 is limited in the guide sleeve 73, and is in sliding fit with the guide sleeve 73. The damper spring 74 is limited between the positioning ring 71 and the guide sleeve 73. A position of the guide sleeve 73 is fixed.

In the embodiment, there are two energy storage mechanisms 6 that are respectively positioned at a same side or different sides of the air inlet pipe 2, so as to better deal with change of the air pressure.

In the embodiment, there are two cushion mechanisms 7 that are respectively positioned at a same side or different sides of the straight pipe 3, so as to ensure the cushion effect.

In order to fully mix the foam concentrate, a porous plate 31 is further fixed in the straight pipe 3. After entering the straight pipe 3, the foam concentrate is further dispersed through the porous plate 31 to yield the better mixing effect.

Figure 4:
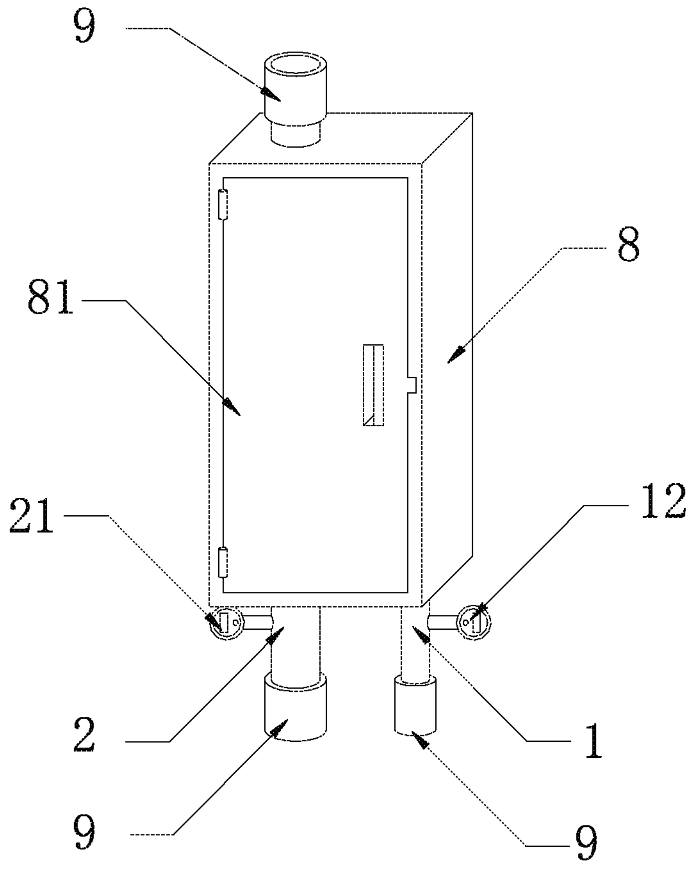
FIG. 4 is a schematic structural view of an outer housing of an air mixer for a CAF fire-extinguishing system according to an embodiment of the present disclosure.

As shown in FIG. 4, the air mixer in the embodiment further includes a housing 8 to make its structure more stable and reliable. The housing 8 is welded from stainless steel plates, and is approximately of a cube structure. A protective door 81 is provided at a front side of the housing, facilitating inspection and maintenance for components in the housing 8. The straight pipe 3, the first tapered pipe 4, the second tapered pipe 5, the energy storage mechanism 6, and the cushion mechanism 7 are positioned in the housing 8. An inlet end of each of the liquid inlet pipe 1 and the air inlet pipe 2 is led out from a bottom wall of the housing 8 to connect an external device. The outlet end of the straight pipe 3 is led out from a top wall of the housing 8 to connect an external device which is a pipe of a foam lance generally. The guide sleeve 73 is fixed in the housing 8. An end of the guide post 72 away from the guide sleeve 73 abuts against an inner wall of the housing 8. A rubber pad 75 is fixed on an abutting surface of the guide post, so as to reduce vibration noise. For ease of quick connection with the external device in the embodiment, a quick connector 9 is provided at the pipe opening positioned out of the housing 8, of each of the liquid inlet pipe 1, the air inlet pipe 2, and the straight pipe 3.

In the embodiment, a one-way valve 11 is further provided on the liquid inlet pipe 1. The one-way valve 11 is positioned in the housing 8. A digital barometer 21 and a digital hydraulic pressure gauge 12 are respectively arranged on the air inlet pipe 2 and the liquid inlet pipe 1. Both the digital barometer 21 and the digital hydraulic pressure gauge 12 are positioned outside the housing 8, for ease of real-time inspection.

Embodiment 2

The embodiment discloses a CAF fire-extinguishing system, including a foam concentrate supply system, a compressed air supply system, a foam ejector system, and the air mixer in Embodiment 1. An outlet end of the foam concentrate supply system is connected to an inlet end of the liquid inlet pipe 1. An outlet end of the compressed air supply system is connected to an inlet end of the air inlet pipe 2. An inlet end of the foam ejector system is connected to an outlet end of the second tapered pipe 5.

Working Principle:

A foam concentrate and compressed air are respectively transported by a liquid inlet pipe 1 and an air inlet pipe 2. When the compressed air and the foam concentrate enter a straight pipe 3 through a first tapered pipe 4, they reach an outlet end of the first tapered pipe 4 through a path narrowing due to different cross-section diameters at two ends of the first tapered pipe 4, and there is a compression process. Under an action of a high-pressure airflow, the foam concentrate is fully mixed. A one-way valve 11 between a guide pipe and the liquid inlet pipe 1 can prevent backflow of the foam concentrate.

The mixed foam concentrate reaches a porous plate 31 of the straight pipe 3 and can be mixed secondarily through pores of the porous plate 31. When the foam concentrate is discharged by a second tapered pipe 5, a flow path widens and there is a release process. Therefore, the present disclosure improves a mixing quality of the foam concentrate during the compression and release processes.

When the foam concentrate and the compressed air pass through the straight pipe 3, a damper spring 74 can support the straight pipe 3. The damper spring 74 is cooperated with the rubber pad 75 to work jointly, such that kinetic energy of the straight pipe 3 can be absorbed, and the straight pipe 3 is not vibrated easily with desirable stability. A guide post 72 can be guided by a guide sleeve 73, and the damper spring 74 can be limited by the guide post 72.

An energy storage spring supports a piston 62 and is configured to store energy. When transported by the air inlet pipe 2, the compressed air can apply a pressure to the piston 62 in the case of a pressure surge due to an unstable pressure. The piston 62 can transfer the pressure to the energy storage spring, and thus the energy storage spring is compressed. Therefore, an impact force arising from the pressure surge can absorbed, thereby cushioning the pipe.

When the pressure in the air inlet pipe 2 is restored to a normal pressure, the pressure applied to the piston 62 is removed, and the energy storage spring can push the piston 62 for restoration. In this process, a blind pipe 61 can guide and limit the piston 62, and thus the piston 62 is not inclined easily.

By turning on a switch of a digital hydraulic pressure gauge 12 and a switch of a digital barometer 21, a hydraulic pressure in the liquid inlet pipe 1 and an air pressure in the air inlet pipe 2 can be respectively monitored through the digital hydraulic pressure gauge 12 and the digital barometer 21.

The foregoing embodiments are only used to explain the technical solutions of the present disclosure, and are not intended to limit the same. Although the present disclosure is described in detail with reference to the foregoing embodiments, those of ordinary skill in the art should understand that they can still modify the technical solutions described in the foregoing embodiments, or make equivalent substitutions on some technical features therein. These modifications or substitutions do not make the essence of the corresponding technical solutions deviate from the spirit and scope of the technical solutions of the embodiments of the present disclosure.

The invention claimed is:

1. An air mixer for a compressed air foam (CAF) fire-extinguishing system, comprising a liquid inlet pipe (1), an air inlet pipe (2), a straight pipe (3), a first tapered pipe (4), a second tapered pipe (5), an energy storage mechanism (6), and a cushion mechanism (7), wherein the first tapered pipe (4) is a three-way pipe; the air inlet pipe (2), the first tapered pipe (4), the straight pipe (3), and the second tapered pipe (5) are sequentially connected according to an airflow direction; the liquid inlet pipe (1), the first tapered pipe (4), the straight pipe (3), and the second tapered pipe (5) are sequentially connected according to a foam concentrate direction; and small-diameter ends of the first tapered pipe (4) and the second tapered pipe (5) are respectively connected to an inlet end and an outlet end of the straight pipe (3);

the energy storage mechanism (6) comprises a blind pipe (61), a piston (62), and an energy storage spring (63); an inlet of the blind pipe (61) is sealingly fixed to an opening in a wall of the air inlet pipe (2); a cavity of the blind pipe (61) communicates with a cavity of the air inlet pipe (2); the piston (62) is positioned and limited in the blind pipe (61); and the energy storage spring (63) is limited between the piston (62) and a blind end of the blind pipe (61);

the cushion mechanism (7) comprises a positioning ring (71), a guide post (72), a guide sleeve (73), and a damper spring (74); the positioning ring (71) is fixed on the guide post (72); the damper spring (74) is sleeved on the guide post (72); one end of the guide post (72) is limited in the guide sleeve (73), and is in sliding fit with the guide sleeve (73); the damper spring (74) is limited between the positioning ring (71) and the guide sleeve (73); and a position of the guide sleeve (73) is fixed; and wherein two cushion mechanisms (7) are provided and respectively positioned at a same side or different sides of the straight pipe (3);

a porous plate (31) is further fixed in the straight pipe (3);

the air mixer further comprises a housing (8); the straight pipe (3), the first tapered pipe (4), the second tapered pipe (5), the energy storage mechanism (6), and the two cushion mechanisms (7) are positioned in the housing (8); an inlet end of each of the liquid inlet pipe (1) and the air inlet pipe (2) is led out from the housing (8) to connect an external device; and the outlet end of the straight pipe (3) is led out from the housing (8) to connect an external device; and the guide sleeve (73) is fixed in the housing (8).

2. The air mixer for a CAF fire-extinguishing system according to claim 1, wherein two energy storage mechanisms (6) are provided and respectively positioned at a same side or different sides of the air inlet pipe (2).

3. The air mixer for a CAF fire-extinguishing system according to claim 2, wherein an end of the guide post (72) away from the guide sleeve (73) abuts against an inner wall of the housing (8); and a rubber pad (75) is fixed on an abutting surface of the guide post (72).

4. A compressed air foam (CAF) fire-extinguishing system, comprising a foam concentrate supply system, a compressed air supply system, a foam ejector system, and the air mixer according to claim 2, wherein an outlet end of the foam concentrate supply system is connected to an inlet end of the liquid inlet pipe (1); an outlet end of the compressed air supply system is connected to an inlet end of the air inlet pipe (2); and an inlet end of the foam ejector system is connected to an outlet end of the second tapered pipe (5).

5. The air mixer for a CAF fire-extinguishing system according to claim 1, wherein an end of the guide post (72) away from the guide sleeve (73) abuts against an inner wall of the housing (8); and a rubber pad (75) is fixed on an abutting surface of the guide post (72).

6. The air mixer for a CAF fire-extinguishing system according to claim 1, wherein a one-way valve (11) is further provided on the liquid inlet pipe (1).

7. The air mixer for a CAF fire-extinguishing system according to claim 1, wherein a digital barometer (21) and a digital hydraulic pressure gauge (12) are respectively arranged on the air inlet pipe (2) and the liquid inlet pipe (1).

8. A compressed air foam (CAF) fire-extinguishing system, comprising a foam concentrate supply system, a compressed air supply system, a foam ejector system, and the air mixer according to claim 1, wherein an outlet end of the foam concentrate supply system is connected to an inlet end of the liquid inlet pipe (1); an outlet end of the compressed air supply system is connected to an inlet end of the air inlet pipe (2); and an inlet end of the foam ejector system is connected to an outlet end of the second tapered pipe (5).

* * * * *